(12) United States Patent
Sarlioglu et al.

(10) Patent No.: US 7,355,367 B2
(45) Date of Patent: Apr. 8, 2008

(54) SYSTEM AND METHOD FOR AC POWER GENERATION FROM A RELUCTANCE MACHINE

(75) Inventors: Bulent Sarlioglu, Torrance, CA (US); Colin E. Huggett, Longmont, CO (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/833,125

(22) Filed: Aug. 2, 2007

(65) Prior Publication Data

US 2007/0268005 A1 Nov. 22, 2007

Related U.S. Application Data

(60) Division of application No. 11/311,627, filed on Dec. 20, 2005, which is a continuation-in-part of application No. 11/268,486, filed on Nov. 8, 2005, now Pat. No. 7,307,403.

(51) Int. Cl.
*H20P 9/46* (2006.01)

(52) U.S. Cl. .................. 322/47; 322/22; 322/20; 322/89; 322/24; 290/4 D

(58) Field of Classification Search ............. 322/47, 322/29, 89, 22, 24, 36, 90; 290/4 D
See application file for complete search history.

(56) References Cited

U.S. PATENT DOCUMENTS

| | | | |
|---|---|---|---|
| 4,794,316 A | 12/1988 | Uchino et al. | |
| 5,404,091 A | 4/1995 | Radun | |
| 5,428,275 A | 6/1995 | Carr et al. | |
| 5,512,811 A | 4/1996 | Latos et al. | |
| 5,587,647 A * | 12/1996 | Bansal et al. | 322/45 |
| 5,703,421 A | 12/1997 | Durkin | |
| 5,780,997 A | 7/1998 | Sutrina et al. | |
| 5,850,133 A | 12/1998 | Heglund | |
| 5,929,612 A | 7/1999 | Elsenhaure et al. | |
| 6,011,377 A | 1/2000 | Heglund et al. | |
| 6,467,725 B1 | 10/2002 | Coles et al. | |
| 6,815,934 B2 * | 11/2004 | Colley | 322/47 |
| 6,847,194 B2 | 1/2005 | Sarlioglu et al. | |
| 6,933,705 B1 * | 8/2005 | Howes | 322/29 |

* cited by examiner

*Primary Examiner*—Darren Schuberg
*Assistant Examiner*—Iraj A. Mohandesi
(74) *Attorney, Agent, or Firm*—Oral Caglar, Esq.

(57) ABSTRACT

A system and method is provided for generating AC power using a synchronous reluctance machine (12) or a salient-pole synchronous machine (102) and a power converter (110). The present invention can be used to achieve power production for a synchronous reluctance machine (12), or can be used to achieve AC power from a traditional salient-pole synchronous machine/starter (102) without dependence upon a rotor current which is subject to failure. In the power generation system, the control system and method can include a power converter (110), controlled by a voltage command and at least one of a measured AC bus (125) current and voltage, and a DC link (120) voltage, for use with a synchronous reluctance machine (102) and a prime mover (116), such that movement of the rotor of the synchronous reluctance machine (102) can be used to produce at least partial AC power generation on the AC bus (125).

20 Claims, 5 Drawing Sheets

SYSTEM AND METHOD FOR AC POWER GENERATION FROM A RELUCTANCE MACHINE

CROSS-REFERENCE TO RELATED APPLICATIONS

This application is a division of U.S. patent application Ser. No. 11/311,627, filed Dec. 20, 2005, which is a continuation-in-part of U.S. patent application Ser. No. 11/268,486, entitled "System And Method For DC Power Generation From A Reluctance Machine", filed in the U.S. Patent and Trademark Office on Nov. 8, 2005 now U.S. Pat. No. 7,307,403; the entire disclosure of both applications are hereby incorporated by reference.

FIELD OF THE INVENTION

The present invention relates to a control system and method for achieving AC power generation from a synchronous reluctance machine. More specifically, the present invention relates to a control system and method to achieve AC power production from a synchronous reluctance machine or from a traditional salient-pole synchronous machine/starter without dependence upon rotor field current.

BACKGROUND OF THE INVENTION

Aircraft electrical power systems have increasingly required the development of systems which can provide larger and larger electrical supplies under both normal and abnormal conditions. As noted in U.S. Pat. No. 6,467,725 issued to Coles et al., the entire disclosure of which is incorporated herein by reference, a greater dependence on electrical power requires an electrical supply that is available at all times that an aircraft is in service.

As noted in the Coles Patent, emergency electrical power in the event of engine failure has been traditionally provided by auxiliary devices, such as a ram air turbine (RAT), which comprises an electrical generator equipped with a propeller. The RAT is normally stored within the fuselage of an engine and is deployed into the air stream surrounding the aircraft when required. The resulting flow of air over the RAT causes a propeller to rotate, thereby generating electrical power. Unfortunately, several such devices may be required in order to ensure sufficient power is available in the event of total engine failure, which can incur significant additional weight to the system.

The Coles Patent addresses the problems disclosed above through the incorporation of a "windmill" effect applied to a bypass fan and a generator. As pointed out in the Coles Patent, it is known that in a multistage high bypass gas turbine engine, the low pressure shaft (LP) or low speed spool which drives the low pressure compressor and the bypass fan will continue to rotate in the event of engine failure because of a "windmill" effect created by the airflow resulting from the motion of the aircraft. The energy of the fan is then extracted by a generator connected to the low pressure shaft, and is then used to supply electrical power to the aircraft during periods of failure.

Where engine failure does not occur, of equal concern is the failure of systems or components in the power generation system. Such a power generation system typically includes a permanent magnet generator, an exciter salient-pole synchronous machine, and a main salient-pole synchronous machine coupled with a prime mover, such as a gas turbine engine. During normal operation, the permanent magnet machine provides rectified power to an exciter regulator, which in turn controls an exciter field current that produces a rotating multi-phase voltage. This multi-phase voltage is rectified to produce a main machine field current and the resultant flux produced by this field current produces a voltage at the stator windings of the main machine. Regulation of the output voltage is achieved by comparing the output voltage to a pre-n determined reference and adjusting the exciter field winding.

However, the loss of excitation power to the main machine can be caused by the failure of any system or component noted above, including the armature of the PM generator, the diodes of the multiphase rectifier which serve to rectify the output of the armature voltages of the PM generator, the exciter regulator (i.e. semiconductor switches), the generator control unit (GCU), the field and armature of the exciter machine, the diodes of the multiphase rotating rectifier, and the field winding of the machine.

The loss of excitation prevents the production of a main field flux in the main machine, and as a consequence, the machine cannot produce any electrical power. Accordingly, there is a need for a system and method to control a power generation system to provide AC power generation capability by using a reluctance machine or a salient-pole synchronous generator without dependence upon rotor current which is subject to failure. Furthermore, there is also a need for a system and method to simplify the traditional generation system by utilizing only one electrical machine such as synchronous reluctance machine, which can eliminate the need for other electrical machines, such as PM and exciter machines of the traditional aircraft generation system.

Accordingly, a need exists for a system and method which enables AC power generation from a synchronous reluctance machine or a salient-pole synchronous machine without dependence upon rotor field current.

SUMMARY OF THE INVENTION

Accordingly, the present invention has been made to substantially solve the above and other problems, and to provide other benefits. An object of exemplary embodiments of the present invention therefore, is to provide a power generation control system and method for AC power generation using a synchronous reluctance machine.

Another object of exemplary embodiments of the present invention is to provide a power generation control system and method to simplify the traditional generation system by utilizing only a synchronous reluctance machine to eliminate the need for other electrical machines of the traditional aircraft generation system.

Another object of exemplary embodiments of the present invention is to provide a power generation control system and method for AC power generation using the reluctance power of a salient-pole synchronous generator without dependence upon rotor field current.

In accordance with an embodiment of the present invention, a control system and method and a synchronous reluctance machine are gainfully used to achieve an AC electric power generation system as well as prime mover startup, such as for a gas engine in an aircraft. Embodiments of the present invention comprise a control system and method for providing AC power generation using a synchronous reluctance machine, and for providing AC power generation using a traditional salient-pole synchronous machine without dependence upon rotor current which is subject to failure. Embodiments of the present invention comprise a synchronous reluctance or salient-pole synchronous machine, a power converter, and associated control electronics to control AC power production of the synchronous reluctance machine or salient-pole synchronous machine. Since embodiments of the present invention operate with no field winding, the need for a PM generator, exciter machine and associated power electronics and control systems for the exciter of the traditional system is eliminated. In doing so, embodiments of the present invention can reduce the size, weight and cost of the power generation system for some applications. A higher mean time between failures value for the overall system can also be achieved. Additional benefits include the elimination of heat generation due to copper losses and conduction losses of rotating diodes in the rotor.

By utilizing the AC reluctance power generation capability of a synchronous reluctance machine or a synchronous reluctance machine without dependence upon rotor current, the need for or dependence upon the permanent magnet generator, exciter machine, exciter power supply and inverter (in the case where prime mover start-up will also be done using only reluctance), the GCU and rotating diode rectifier can be eliminated. This provides a simple AC power generation and start up system, as no field excitation of the exciter machine or additional control for field adjustments are required. Embodiments of the present invention can be successfully implemented and provide a lower weight, size and cost, and higher reliability mean time between failures (MTBF) of aircraft power generation systems for a wide range of aircraft, from small to large transport and military aircraft. Additional benefits include a decreased overall space requirement for supporting electronics, as well as the elimination of additional weight and heat generation.

BRIEF DESCRIPTION OF THE DRAWINGS

These and other objects, advantages and novel features of the present invention will become more readily appreciated from the following detailed description when read in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention comprise a control system and method for achieving AC power generation using a synchronous reluctance machine or for achieving AC power generation using a traditional salient-pole synchronous machine without dependence upon rotor current which is subject to failure. Exemplary embodiments of the present invention comprise a synchronous reluctance or salient-pole synchronous machine, a power converter, and associated control electronics to control AC power production of the synchronous reluctance machine or salient-pole synchronous machine.

A synchronous reluctance machine can be defined as an electrical machine where there is no field winding or permanent magnet in its rotor, but one that has a saliency in its so called d- and q-axis reactances. The stator can be wound with three or more phase sinusoidally distributed windings. In the following exemplary implementations, embodiments of the present invention are used to achieve AC power generation using a synchronous reluctance machine or using a traditional salient-pole synchronous machine/starter without dependence upon rotor current. The AC power can be utilized to power other loads in an application, such as in an aircraft. That is, an exemplary application illustrates the use of an embodiment of the present invention with a traditional salient-pole synchronous generator system where there is no rotor field. However, embodiments of the present invention are equally applicable to achieve power production for any synchronous reluctance machine.

Figure 1:
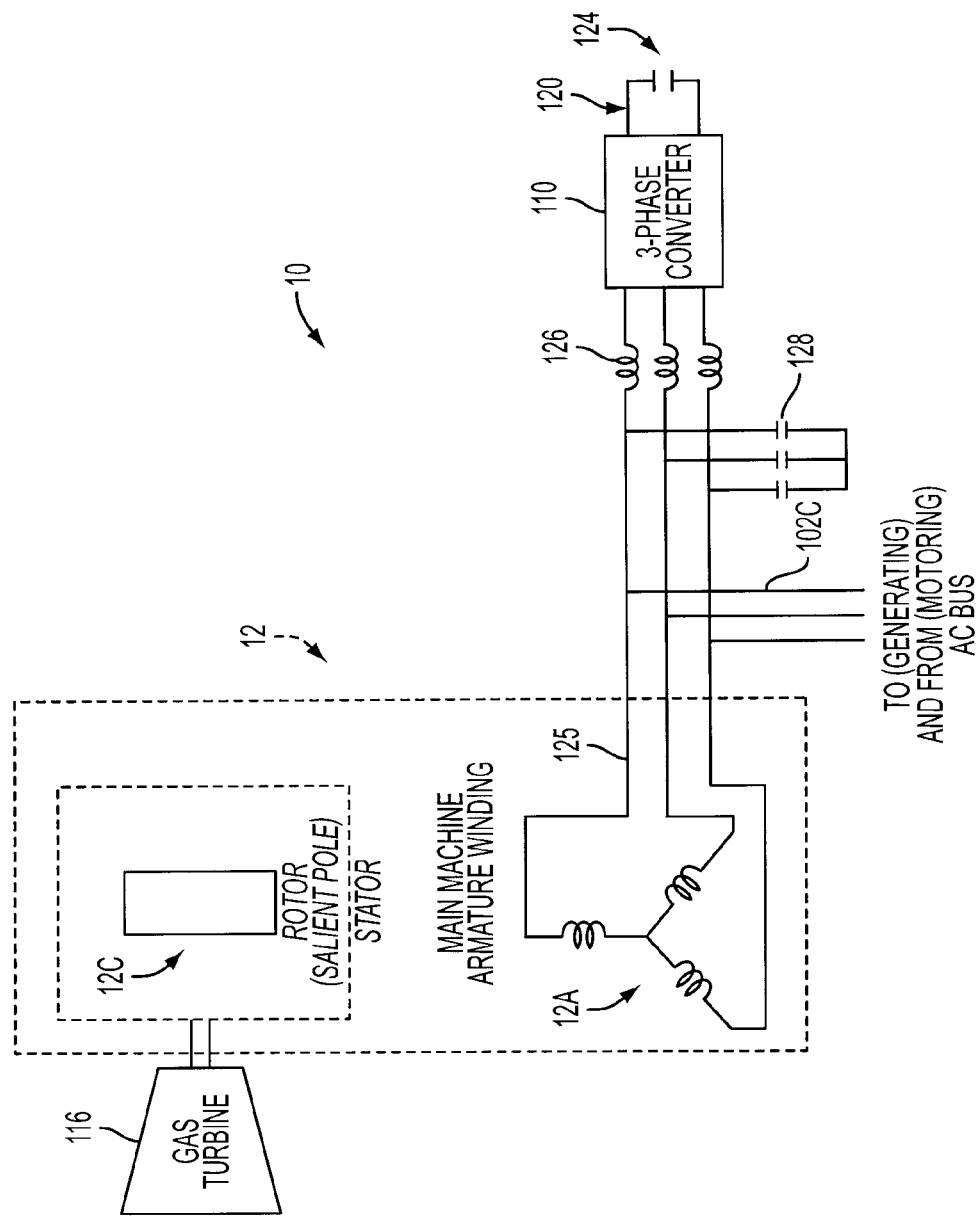
FIG. 1 is a block diagram illustrating an example of a synchronous reluctance machine, and which further reflects an example of a salient-pole synchronous machine which has no dependence upon rotor current and to which a power generation system in accordance with an exemplary embodiment of the present invention can be applied.

Embodiments of the present invention can be used to generate AC power for AC loads using a synchronous reluctance machine or a salient pole synchronous machine without dependence upon rotor field current, that is, without field current in its rotor. FIG. 1 illustrates a synchronous reluctance machine or a salient pole synchronous machine without field current in its rotor. In an exemplary application, the output of the machine of FIG. 1 is coupled to a three phase load and to a power converter. The power converter is comprised of an inverter, AC capacitors electrically connected in a wye, or "star" coupled configuration, AC inductors electrically connected in series, and a DC-link capacitor as described in greater detail below.

The power converter's function is to regulate the AC capacitor voltage to achieve a constant voltage. This enables embodiments of the present invention to provide current to AC loads via an AC bus. The converter comprises six power semiconductor devices such as 1 GBTs, and also includes a DC capacitor attached to its DC link. On an AC output side, there are three inductors connected between the converter and the AC capacitors. The AC capacitors are connected in a wye configuration. The AC current of the inductors and the AC voltage of the AC capacitors are measured using current and voltage sensors, respectively. The current flowing in the converter is predominantly reactive, with the exception of any active current to compensate for switching losses. That is, there is no load on the DC output side of the power converter. The DC link in this case, is used to provide the reactive power demanded by the AC loads in combination with the synchronous reluctance machine excitation.

The above described exemplary embodiment can be configured as system (10) of FIG. 1, and comprises a prime mover (116), such as a gas turbine engine, an electrical machine, such as a synchronous reluctance machine (12) for generating and motoring the prime mover (116), a 3-phase converter (110) for providing an AC voltage, and a DC link (120) and DC link capacitor (124). The converter (110) and the synchronous reluctance machine (12) are electrically coupled via a three phase AC bus (125). Three inductors (126) are electrically coupled between the converter (110) and the synchronous reluctance machine (12). The AC bus (125) is electrically coupled to capacitors (128) which are connected in a wye configuration between phases of the AC bus (125). In a first embodiment of the present invention, the AC current of the inductors (126) and the AC voltage of the AC capacitors (128) are measured using current and voltage sensors (shown in FIGS. 4 and 5), respectively. The measured current and voltage values are then coupled to an exemplary control system as described in greater detail below.

The electrical machine typically comprises a main synchronous reluctance machine (12) having a armature winding (12A) electrically coupled to the 3-phase converter (110), and a salient pole rotor (12C) where there is no rotor field present. The system (10) of FIG. 1 does not require a PM generator, exciter machine, exciter regulator, rotating rectifier, field winding, and GCU.

In FIG. 1, there is no rotor field or field winding of the synchronous reluctance machine (12). However, as described in greater detail below, a rotor saliency is present.

In accordance with an exemplary embodiment of the present invention, a portion of the rated power supply can be generated using the reluctance of the synchronous reluctance machine (12) where the prime mover (116) is operational. This allows the use of embodiments of the present invention to provide critical AC power requirements of an aircraft, which can be of particular importance as more electric power is used for various aircraft functions in the future. A specific implementation of an exemplary embodiment of the present invention will now be described in greater detail. Although FIG. 1 illustrates a general synchronous reluctance machine (12) to which an exemplary embodiment of the present invention can be applied, a more clear understanding of the present invention can be illustrated using a traditional salient-pole synchronous machine in the case where there is no rotor field.

As noted above, embodiments of the present invention are equally applicable to a traditional salient-pole synchronous machine without dependence upon rotor current which is subject to failure. This exemplary application is described in greater detail with reference to FIGS. 2-5, but is not limited thereto. The following embodiments of the present invention are applicable with substantially the same results to the general synchronous reluctance machine of FIG. 1.

Figure 2:
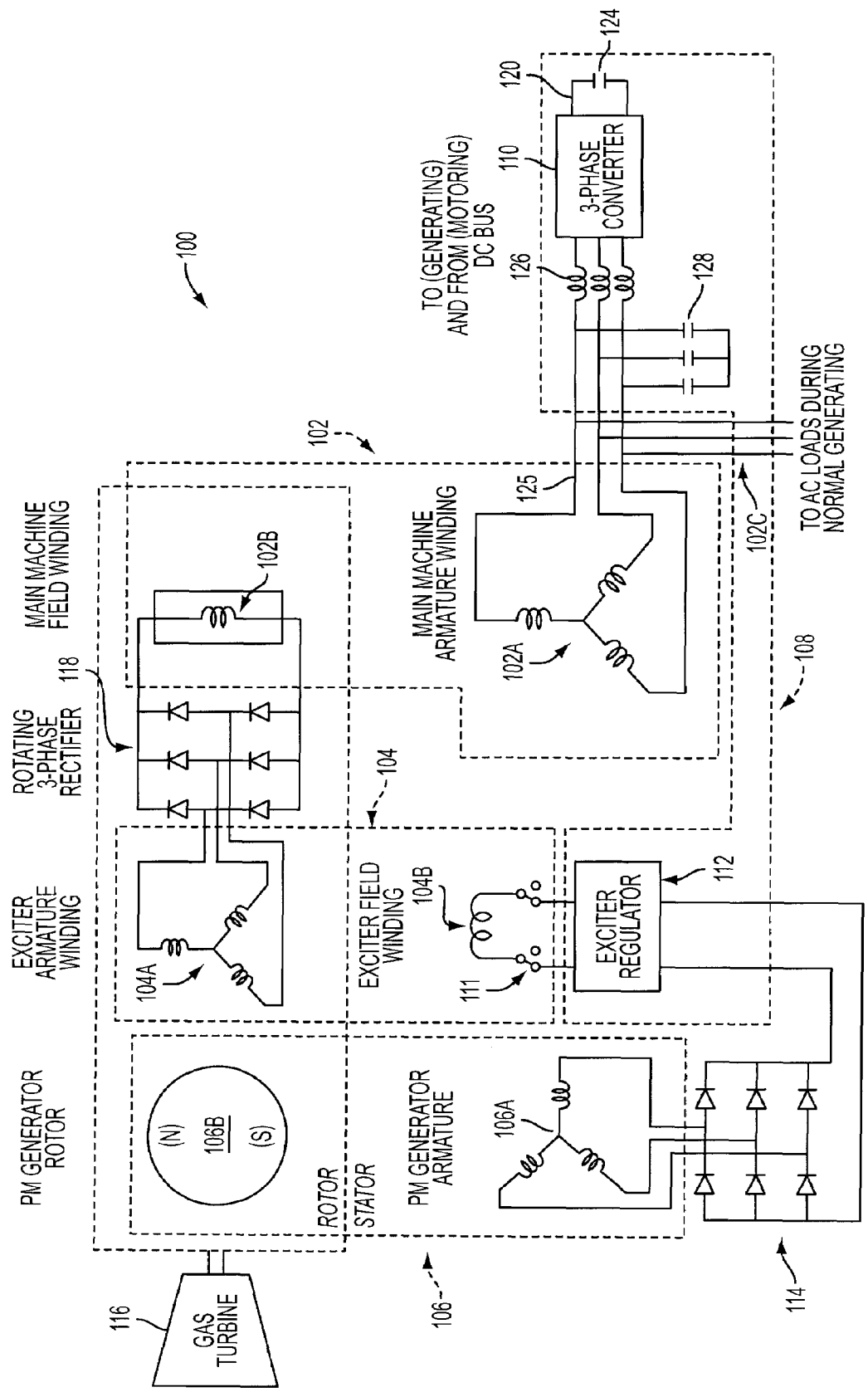
FIG. 2 is a block diagram illustrating an example of a conventional salient-pole synchronous machine to which an exemplary embodiment of the present invention can be applied.

FIG. 2 is a block diagram illustrating an example of a salient-pole synchronous machine to which an exemplary embodiment of the present invention can be applied. In FIG. 2, a block diagram illustrating an example of a system (100) for generating and motoring a prime mover, such as a gas turbine engine, is shown. The system includes a three phase converter and associated control system to provide mainly reactive power. The system (100) of FIG. 2 comprises at least three electrical machines (102), (104) and (106), the prime mover (116) such as a gas turbine as described in FIG. 1, and an active and passive power electronics circuit (108). The three electrical machines typically comprise a permanent magnet (PM) generator (106), an exciter salient-pole synchronous machine (104), and a main salient-pole synchronous machine (102). As shown in FIG. 2, the main machine, or starter/generator (S/G) (102), exciter (104), and PM generator (106), are arranged to allow multiple modes of operation, as described in greater detail below.

The system (100) also comprises the main machine (3-phase) converter (110) as described in FIG. 1, a multiphase rectifier (114) electrically coupled between the PM generator (106) and exciter (104), a multiphase rotating rectifier (118) electrically coupled between the armature (104A) of the exciter (104) and field (102B) of the main machine (102), and associated control circuit (or exciter regulator) (112) for the exciter portion, where the plural phase converter (110) and the exciter regulator (112) operate in cooperation as the active and passive power electronics circuit (108).

The first multiphase rectifier (114) is electrically coupled to the armature winding (106A) of the PM generator (106) and to the field winding (104B) of the exciter (104) via the exciter regulator (112). The second multiphase rectifier (118) is located on the rotor of the main machine (102) and is electrically coupled to the armature winding (104A) of the exciter (104) and to the field winding (102B) of the main machine (102). The main machine converter (110) is electrically coupled to the armature winding (102A) of the main machine (102), AC load lines (102C) and the DC link (120). The DC link capacitor (124) is coupled between the leads of the DC link (120) as described in FIG. 1. Additionally, the converter (110) and the synchronous reluctance machine (102) are electrically coupled via the three phase AC bus (125) and the inductors (126), which are electrically coupled in parallel. Each phase of the AC bus (125) is also electrically coupled via the wye coupling of the capacitors (128). As noted above, the AC current of the inductors (126) and the AC voltage of the AC capacitors (128) are measured using current and voltage sensors (shown in FIGS. 4 and 5), respectively, and are then coupled to an exemplary control system as described in greater detail below.

As can be seen from FIG. 2, in order to achieve field current in the rotor of the main machine (102), there are many processes involved, each of which can be subject to numerous component and system failures. When systems are fully functional, the permanent magnet machine (106) provides rectified power to the exciter regulator (112), which in turn controls the exciter field current that produces a rotating multi-phase voltage. This multi-phase voltage is rectified by the multiphase rotating rectifier (118) to produce a main machine field current in the field (102B), and the resultant flux produced by this field current produces a voltage at the stator windings (102A) of the main machine (102). Regulation of the output voltage is achieved by comparing the output voltage to a pre-determined reference, and adjusting the exciter field winding using the exciter regulator (112). However, the loss of rotor current can be caused by the failure of several systems and components, including the armature (106A) of the PM generator (106), the diodes of the multiphase rectifier (114) which serve to rectify the output of the armature voltages of the PM generator (106), the exciter regulator (112) (i.e. semiconductor switches), 10 the generator control unit (GCU) (not shown), the field (104B) and armature (104A) of the exciter machine (104), the diodes of the multiphase rotating rectifier (118), and the field winding (102B) of the machine (102).

The result of such component and system failures can be illustrated by an equivalent synchronous reluctance machine model as shown in FIG. 1. That is, where there is no rotor field current, the system (100) of FIG. 2 can be illustrated as the system (10) of FIG. 1. In FIG. 1, the block diagram (10) illustrates a synchronous reluctance machine (12), and also illustrates an example of the salient-pole synchronous machine system (100) in which there is no rotor field current. However, the prime mover (116) is still operational and/or there is a windmilling effect rotating the shaft of the prime mover.

In FIG. 1, there is no current in the field winding of the machine. However, as described in greater detail below, a rotor saliency is present. In FIG. 1, the system (10) comprises the main machine armature winding (12A) and rotor (12C), corresponding to the main machine rotor and armature winding (102A) in FIG. 2. The system (10) further comprises the main machine converter (110), and further includes the AC bus (125) coupled to an AC load during the generation mode.

In accordance with an exemplary embodiment of the present invention, a portion of the rated power supply can be generated using the reluctance of the salient machine (12) where the prime mover (116) is operational and/or where there is a windmilling effect rotating the shaft of the prime mover, even using the main salient-pole synchronous machine (102) without dependence upon rotor current, for example, in a case where there is no rotor field current for any reason. This allows the use of embodiments of the present invention to provide critical AC power requirements of the aircraft, which can be of particular importance as more electric power is used for various aircraft functions in the future.

As noted above, an implementation of an exemplary embodiment of the present invention can preferably occur where the prime mover (116) is operational, but where there is no rotor field current. The detection of prime mover (116) operation can be achieved by any number of techniques as known to those skilled in the art, such as by checking the speed of the prime mover output shaft for rotation. Returning to the example implementation of FIG. 1, if the shaft of the prime mover (116) is rotating and yet there is no rotor field current, then a controller in accordance with an embodiment of the present invention initiates a control scheme for the system as described in greater detail below.

The system (100) of FIG. 2 can operate normally in several modes, such as a generation mode, and motoring mode to start-up the prime mover. During generation, the permanent magnet machine (106) provides rectified power to the exciter regulator (112), which in turn controls the exciter field current that produces a rotating multi-phase voltage. This multi-phase voltage is rectified to produce a main machine field current, and the resultant flux produced by this field current produces a voltage at the stator windings. Where the excitation power is lost, the main machine (102) is limited to substantially reluctance power production only, that is, electrical power generated by reason of the different magnetic reluctance between the so called direct and quadrature axes of the salient-pole rotor of the synchronous machine (102), and the control of a power inverter applied to the terminals of the machine.

However, as noted above, FIG. 1 also applies to a generation system where only a synchronous reluctance machine is used for power generation. The same motor can also be used for motoring to start-up the prime mover.

Figure 3:
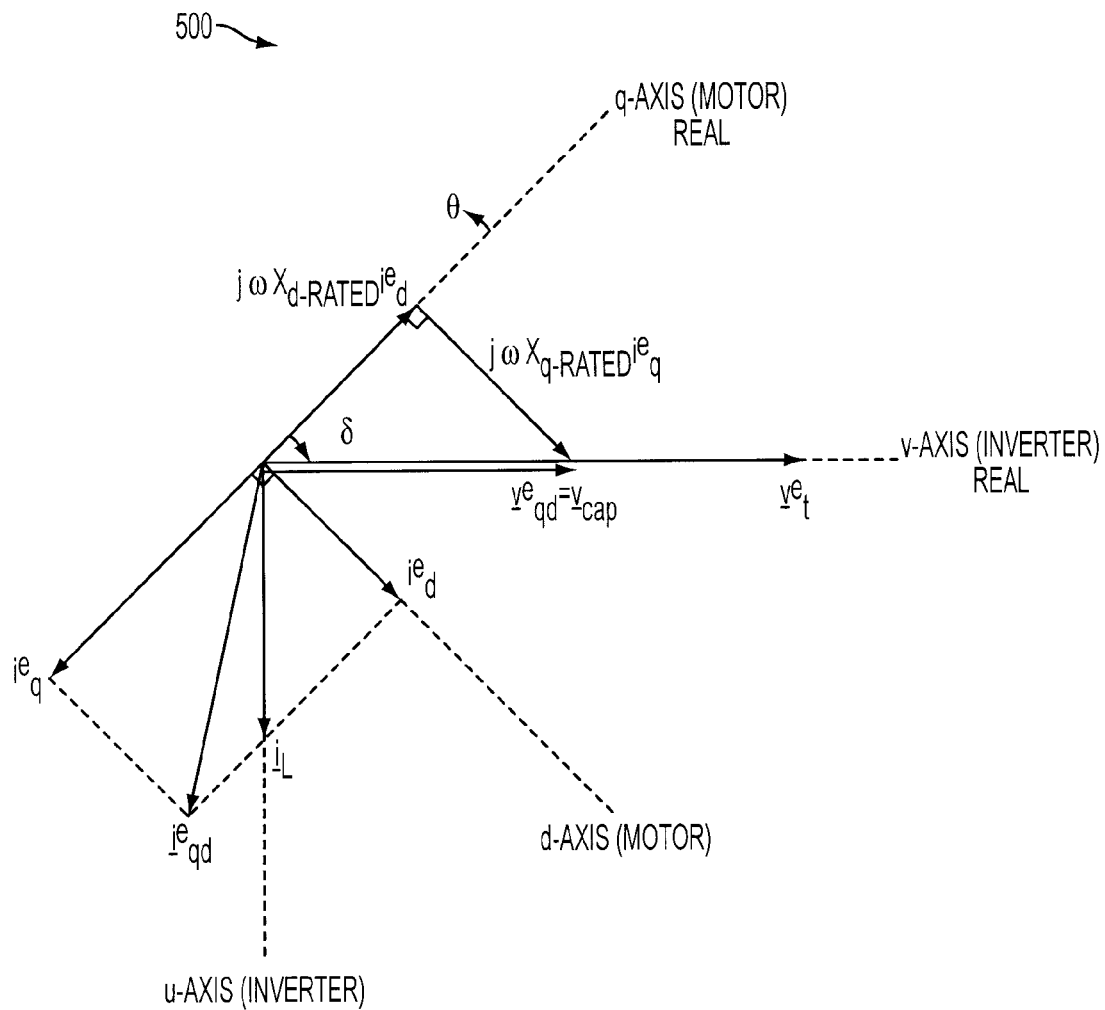
FIG. 3 is a vector diagram illustrating an example of AC power production of a synchronous reluctance machine which has no dependence upon rotor current or of a salient-pole synchronous machine, in accordance with an embodiment of the present invention.

As shown in FIG. 3, the generation mode of operation of the main machine (102) where there is no rotor field, can be obtained by applying a terminal voltage vector $V_t$, synchronous with the rotation of the rotor of the machine (102), to the machine terminals, such that the terminal voltage vector $V_t$ lags the q-axis of the machine (102). As shown in the vector diagram (500) of FIG. 3, the terminal voltage $V_t$ can be at a selected angle (delta) with respect to the q-axis current of the main machine (102), for example delta=45 electrical degrees.

In FIG. 3, two reference frames are shown. The "motor" q-d synchronous reference frame is created with respect to the main machine (102). The angle theta of the rotor of the reluctance machine (102) is defined by the radial line of the rotor passing through the center of the salient-pole and the center line of the "A" phase stator coil. The "inverter" synchronous reference frame v-u reference frame is created with respect to the main machine converter (110). The v-axis is aligned with the Park vector of the AC capacitor voltages, $v_{cap}$. The Park vector of machine terminal voltage $veq^{\ominus}_{qd}$ is equal to the Park vector of the AC capacitor voltages $v_{cap}$. The angle delta is the angle between the v- and q-axis of the converter and main machine synchronous reference frames, respectively. The load angle is not directly controlled in the exemplary embodiment of the present invention. The load demand essentially adjusts the load angle delta by finding an equilibrium point, such that power P demanded by the load is supplied by the main machine. The per unit (pu) power obtained by the reluctance component of the salient-pole main machine (102) can then be described, neglecting the copper loss, in the following equation (1) below, $$P = -\left[\sin 2\delta \frac{(X_d - X_q)V^2}{2X_d X_q}\right] \quad (1)$$

wherein δ is the load angle (delta), $X_d$ is the per unit d-axis synchronous reactance, $X_q$ is the per unit q-axis synchronous reactance and V is the per unit voltage applied to the terminals of the main machine (102).

The saliency of the rotor, or ratio of d-axis and q-axis synchronous reactance, can be described as shown in the following equation (2) below, $$K = \frac{X_d}{X_q} \quad (2)$$

and, where K is greater than 1, in which a higher saliency ratio is desired, the per unit power obtained by the reluctance component of the salient-pole synchronous main machine (102) can be described in the following equation (3) below, $$P = -\left[\sin 2\delta \frac{K\left(1 - \frac{1}{K}\right)V^2}{2X_d}\right] \quad (3)$$

In equation (3), P is positive if the machine is in a motoring mode (i.e. δ is negative), and P is negative if it is generating, or in a generating mode (i.e. δ is positive). For V=1 pu, and δ=45 degrees in equation (3), the power of the system can be calculated for several saliency ratios, as shown in Table 1 by way of example, using equation (4) below.

$$P = -\left[\frac{K\left(1 - \frac{1}{K}\right)}{2X_d}\right] \quad (4)$$

As can be seen in Table 1, the greater the saliency ratio, the greater the power output obtained by the reluctance component of the synchronous reluctance or salient-pole synchronous machine (102). As there is no rotor field, there are no copper losses in the rotor of the main machine (102) in this mode of operation.

TABLE 1

| K (saliency ratio) | Power (P = f(1/$X_d$)) |
|---|---|
| 1.5 | −0.25/$X_d$ |
| 3 | −1/$X_d$ |

A control system to implement the various operational modes described above can require knowledge of the rotor operation and position, and can further require the current vector applied to the armature winding (102A) of the main machine (102) to be maintained at a fixed angle with respect to the rotor position for a given power demand by the AC loads. One example of such a control system in accordance with an embodiment of the present invention is presented in FIG. 4 and discussed in greater detail below.

Figure 4:
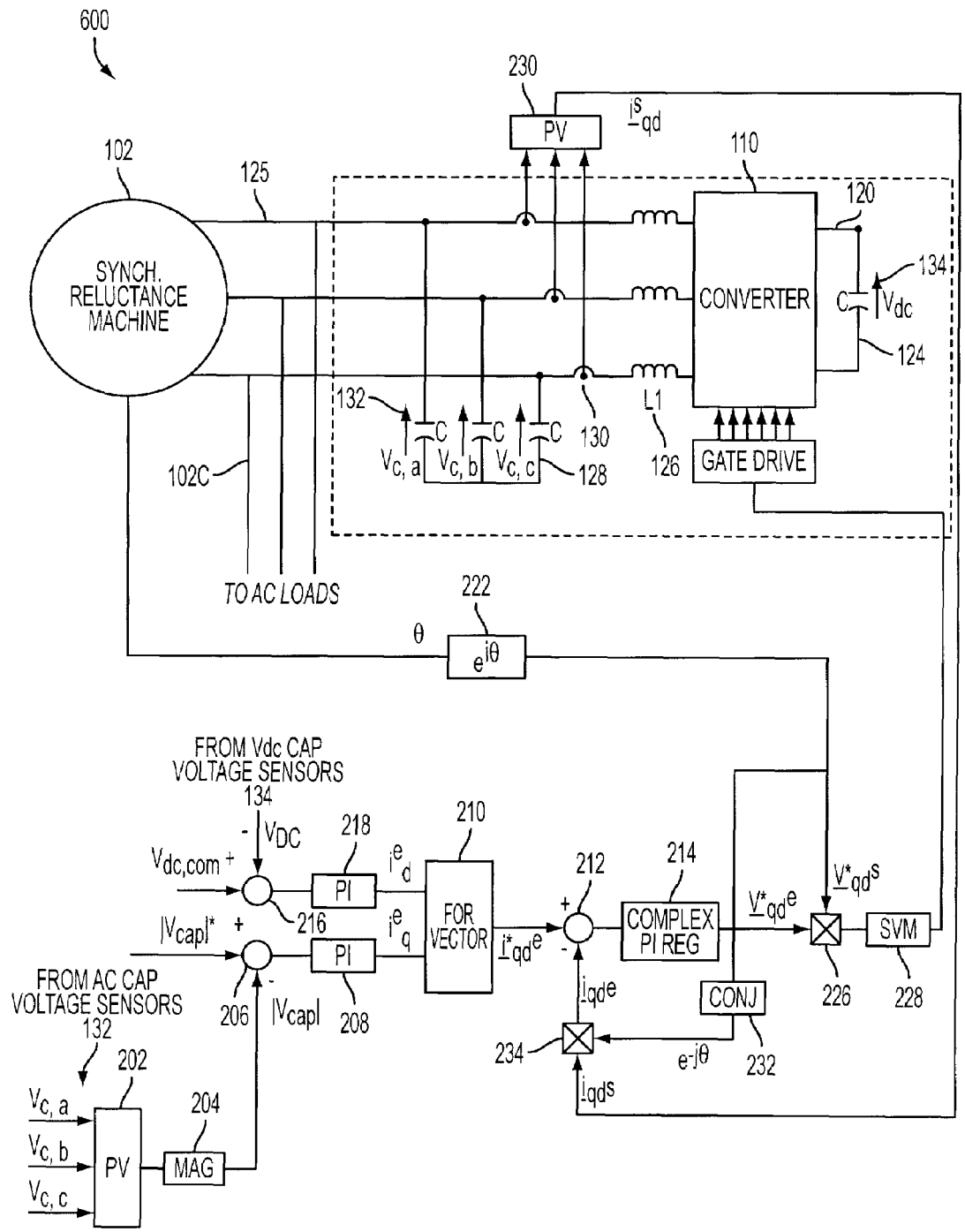
FIG. 4 is a block diagram illustrating an example of a control technique for AC power production from a synchronous reluctance machine as shown in FIG. 1, or from a salient-pole synchronous machine as shown in FIG. 2 without dependence upon rotor current, in accordance with an embodiment of the present invention.

In FIG. 4, a control block diagram of a controller (600) is shown in accordance with an embodiment of the present invention. The controller (600) uses the measured voltage and current of the AC bus (125) for comparison with a commanded voltage magnitude value of the Park vector of the AC capacitor voltages, $v_{cap}$ to form a voltage command Park vector in synchronous reference frame. The controller (600) further uses the measured DC link voltage for comparison with a commanded link voltage value $V_{dc,com}$, and the rotor position, to transform the voltage command Park vector in synchronous reference frame to stationary reference frame to drive the converter (110). In the controller (600), the synchronous reluctance machine, specifically the armature winding (102A) of the main machine (102) is electrically coupled to the converter (110) via inductors (126) in the AC bus (125). The AC bus (125) is further coupled to AC loads (not shown) via the AC load lines (102C).

The AC current of the inductors (126) and the AC voltage of the AC capacitors (128) are measured using current and voltage sensors, respectively. Specifically, the AC current of the inductors (126) is measured using current sensors (130), and the AC voltage of the AC capacitors (128) is measured using voltage sensors (132). The current and voltage sensors (130) and (132) can be comprised of any number of devices as known to those skilled in the art. The measured current and voltage values are then coupled to an exemplary control system as described in greater detail below.

The converter (110) is further coupled to a DC link (120) and DC link capacitor (124). As noted above, the DC link (120) and DC link capacitor (124) are used to provide some or all of the reactive power demanded by the AC load, however, in an exemplary implementation, no DC power is drawn. The converter (110) controls a terminal voltage as described in greater detail below, such that all of the loads coupled in parallel with the capacitors (128) see substantially the same AC voltage. The DC link voltage is coupled to the exemplary control system, and a gate driving signal is received at the converter (110) from the control system as described in greater detail below.

In the following control system, the Park vector of the AC capacitor voltage is constructed using the three AC capacitor (128) voltage measurements. The magnitude of the AC capacitor voltage Park vector is calculated and compared at comparator (206) with a commanded magnitude value of the Park vector of the AC capacitor voltages, $v_{cap}$, and the error is fed to a Proportional Integrator (PI) regulator (208). The PI regulator (208) output comprises a so called q-axis inverter current. The DC link voltage of the converter (110) is measured and compared at comparator (216) with a commanded value $V_{dc,com}$, and the output is fed to a Proportional Integrator (PI) regulator (218) where the output is a so called d-axis inverter current.

The commanded current Park vector is compared at comparator (212) with the measured current Park vector in synchronous reference frame and the error is fed to a complex PI regulator (214) where the output is the voltage command Park vector in synchronous reference frame.

The rotor position, theta, can be either measured or estimated. For example, rotor position can be measured using a Hall effect sensor or resolver, or can be estimated using high frequency injection techniques which use the saliency information in the machine. Rotor position information is used to perform coordinate transformation to achieve a voltage command Park vector in stationary reference frame.

The exemplary control system receives the AC capacitor (128) voltage measurements Vc,a; Vc,b; and Vc,c at a first Park Vector (PV) block (202) which calculates an AC capacitor voltage Park vector. The magnitude of the AC capacitor voltage Park vector, (204), is compared with a commanded AC capacitor voltage value $v_{cap}$ at the first comparator (206). The error of the comparison is fed to the Proportional Integrator (PI) regulator (208) to produce a q-axis inverter current command $i^\Theta_q$. The DC link voltage of the converter (110) is measured using voltage sensors (134) and compared with commanded DC link voltage value $V_{dc,com}$ (for example 270 Vdc) at the second comparator (216), and the output is fed to a Proportional Integrator (PI) regulator (218) where the output is a d-axis inverter current command $i^\Theta_d$. Both q- and d- axis current commands are input to a vector block (210) to form a commanded current Park vector $i^*{}_{qd}{}^\Theta$. The commanded current Park vector $i^*{}_{qd}{}^\Theta$ is then compared with the measured current Park vector at the comparator (212) and the error is fed to the complex PI regulator (214) where the output is the voltage command Park vector in synchronous reference frame $v^*{}_{qd}{}^\Theta$.

The angle of the rotor of the reluctance machine (102), as defined by the radial line of the rotor passing through the center of the salient-pole and the center line of the "A" phase stator coil, is determined and provided to block (222), thereby generating $e^{+j\theta}$. The $e^{+j\theta}$ value is coupled to block (232) to provide $e^{-j\theta}$, which is multiplied at multiplier (234) with the AC inductor voltage Park vector $i^S{}_{qd}$ as described in greater detail below. The $e^{+j\theta}$ value is used to perform coordinate transformation to achieve a voltage command Park vector in stationary reference frame. That is, the $e^{+j\theta}$ value is also coupled with multiplier block (226) to transfer the voltage command Park vector in synchronous reference frame $v^*{}_{qd}{}^\Theta$ to a stationary reference frame $v^*{}_{qd}{}^S$ to drive a pulse width modulated control block (228) using, for example, Space Vector Modulation (SVM). The control block (228) then generates gate driving signals which are coupled to the converter (110).

As shown in FIG. 4, the AC current of the inductors (126) is measured using current sensors (130) and is coupled to Park Vector (PV) block (230) which calculates an AC inductor current Park vector $i^S_{qd}$. The inductor current Park vector $i^S_{qd}$ is multiplied by $e^{-j\theta}$ at multiplier block (234) to produce the measured current Park vector $i_{qd}{}^\ominus$ in the synchronous reference frame that is compared with the commanded current Park vector $i^*_{qd}{}^\ominus$ at comparator (212). The error signal computed at the comparator (212) is operated upon by a complex PI regulator (214), and the output is converted to the stationary reference frame by multiplying the output of the PI regulator (214) with the output of the exponential block (222) at multiplier (226). The output of the multiplier (226) is then applied to the SVM block (228), which converts the voltage vector into duty cycles for power switches (not shown) contained within the power converter (110).

By driving the converter (110) while receiving angle information of the rotor of the reluctance machine (102) and measurements (feedback) from the DC link voltage, AC bus current, and AC bus voltage, embodiments of the present invention can substantially provide an AC voltage to loads on the AC bus (125). The converter (110) can substantially ensure that all loads on the AC bus (125) see substantially the same voltage.

Figure 5:
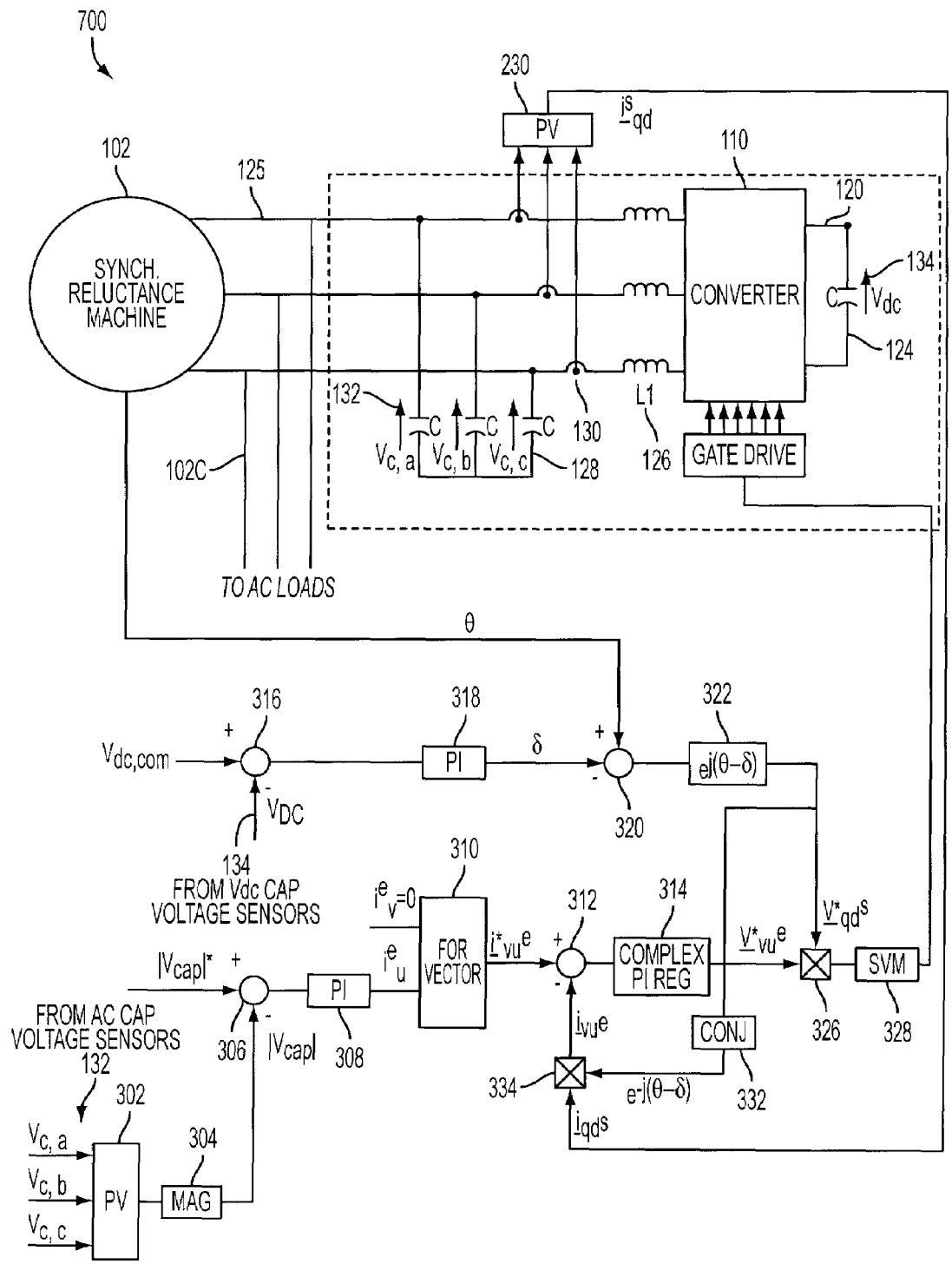
FIG. 5 is a block diagram illustrating an example of another control technique for AC power production from a synchronous reluctance machine as shown in FIG. 1, or from a salient-pole synchronous machine as shown in FIG. 2 without dependence upon rotor current, in accordance with another embodiment of the present invention.

In another embodiment of the present invention shown in FIG. 5, the feedback signals are coupled to the control system in a different manner. In FIG. 5, a control block diagram of a controller (700) is shown in accordance with another embodiment of the present invention. FIG. 5 illustrates an exemplary embodiment based on a v-u "inverter" synchronous reference frame, rather than a q-d "motor" synchronous reference frame. Specifically, in the control block diagram of the controller (700) shown in accordance with another embodiment of the present invention, the reference frame is tied to the inverter synchronous reference frame where the v-axis is collinear with the capacitor Park vector. As in the above described embodiment of FIG. 4, the controller (700) uses the measured voltage and current of the AC bus (125) for comparison with a commanded voltage magnitude value of the Park vector of the AC capacitor voltages, $v_{cap}$ to form a voltage command Park vector in "inverter" synchronous reference frame. The controller (700) further uses the measured DC link voltage for comparison with a commanded link voltage value $V_{dc,com}$, and the rotor position, to transform the voltage command Park vector in inverter synchronous reference frame to stationary reference frame to drive the converter (110). In the controller (700), the synchronous reluctance machine, specifically the armature winding (102A) of the main machine (102) is electrically coupled to the converter (110) via inductors (126) in the AC bus (125). The AC bus (125) is further coupled to AC loads (not shown) via the AC load lines (102C).

The AC current of the inductors (126) and the AC voltage of the AC capacitors (128) are measured using current and voltage sensors, respectively, substantially as described above in regard to the embodiment of FIG. 4. Specifically, the AC current of the inductors (126) is measured using current sensors (130), and the AC voltage of the AC capacitors (128) is measured using voltage sensors (132). The measured current and voltage values are then coupled to an exemplary control system as described in greater detail below.

The converter (110) is further coupled to a DC link (120) and DC link capacitor (124). As noted above, the DC link (120) and DC link capacitor (124) are used to provide some or all of the reactive power demanded by the AC load, however, in an exemplary implementation, no DC power is drawn. The converter (110) controls a terminal voltage as described in greater detail below, such that all of the loads coupled in parallel with the capacitors (128) see substantially the same AC voltage. The DC link voltage is coupled to the exemplary control system, and a gate driving signal is received at the converter (110) from the control system as described in greater detail below.

In the following control system, the Park vector of the AC capacitor voltage is constructed using the three AC capacitor (128) voltage measurements. The magnitude of the AC capacitor voltage Park vector is calculated and compared at comparator (306) with a commanded value of the Park vector of the AC capacitor voltages, $v_{cap}$, and the error is fed to a Proportional Integrator (PI) regulator (308). The regulator output comprises a so called u-axis inverter current. The v-axis current is commanded to a zero to achieve reactive current draw. The commanded current Park vector is compared at comparator (312) with the measured current Park vector and the error is fed to a complex PI regulator (314) where the output is the voltage command Park vector in inverter synchronous reference frame.

The DC link voltage of the converter (110) is measured and compared at comparator (316) with a commanded value $V_{dc,com}$, and the output is fed to a PI regulator (318) where the output is an angle delta. The output angle delta is subtracted at a summer (320) from a rotor position angle (theta) to generate exp (theta−delta) at (322). This is then used to perform coordinate transformation to achieve a voltage command Park vector in stationary reference frame.

The exemplary control system receives the AC capacitor (128) voltage measurements Vc,a; Vc,b; and Vc,c at a first Park Vector (PV) block (302) which calculates an AC capacitor voltage Park vector. The magnitude of the AC capacitor voltage Park vector, (304), is compared with a commanded AC capacitor voltage value $v_{cap}$ at the first comparator (306). The error of the comparison is fed to the Proportional Integrator (PI) regulator (308) to produce a u-axis inverter current command $i^\ominus_u$. A v-axis current is commanded to zero ($i^\ominus_v=0$) to achieve reactive current draw, and both v- and u- axis current commands are input to a vector block (310) to form a commanded current Park vector $i^*_{vu}{}^\ominus$. The commanded current Park vector $i^*_{vu}{}^\ominus$ is then compared with the measured current Park vector at the comparator (312) and the error is fed to the complex PI regulator (314) where the output is the voltage command Park vector in inverter synchronous reference frame $v^*_{vu}{}^\ominus$.

The DC link voltage of the converter (110) is measured using voltage sensors (134) and compared with commanded DC link voltage value $V_{dc,com}$ (for example 270 Vdc) at the second comparator (316), and the output is fed to the Proportional Integrator (PI) regulator (318) where the output is an angle delta which is then provided to summing block (320). The angle theta of the rotor of the reluctance machine (102), as defined by the radial line of the rotor passing through the center of the salient-pole and the center line of the "A" phase stator coil, is determined and provided to the summing block (320), thereby generating $e^{+j(\theta-\delta)}$ at block (322). The $e^{+j(\theta-\delta)}$ value is coupled to block (332) to provide $e^{-j(\theta-\delta)}$, which is multiplied at multiplier (334) with the AC inductor voltage Park vector $i^S_{qd}$ as described in greater detail below. The $e^{+j(\theta-\delta)}$ value is used to perform coordinate transformation to achieve a voltage command Park vector in stationary reference frame. That is, the $e^{+j(\theta-\delta)}$ value is coupled with multiplier block (326) to transfer the voltage command Park vector in inverter synchronous reference frame $v^{*\ominus}_{vu}$ to a stationary reference frame $v^{*S}_{qd}$ to drive a pulse width modulated control block (328) using, for example, Space Vector Modulation (SVM). The control block (328) then generates gate driving signals which are coupled to the converter (110).

As shown in FIG. 5, the AC current of the inductors (126) is measured using current sensors (130) and is coupled to Park Vector (PV) block (230) which calculates an AC inductor current Park vector $i^{S}_{qd}$. The inductor current Park vector $i^{S}_{qd}$ is multiplied by $e^{-j(\theta-\delta)}$ at multiplier block (334) to produce the measured current Park vector $i_{vu}^{\ominus}$ in the inverter synchronous reference frame that is compared with the commanded current Park vector $i^{*\ominus}_{vu}$ at comparator (312). The error signal computed at the comparator (312) is operated upon by a complex PI regulator (314), and the output is converted to the stationary reference frame by multiplying by the output (322) of the summing block (320) at multiplier (326). The output of the multiplier (326) is then applied to the SVM block (328), which converts the voltage vector into duty cycles for power switches (not shown) contained within the power converter (110).

By driving the converter (110) while receiving angle information of the rotor of the reluctance machine (102) and measurements (feedback) from the DC link voltage, AC bus current, and AC bus voltage, embodiments of the present invention can substantially provide an AC voltage to loads on the AC bus (125). The converter (110) can substantially ensure that all loads on the AC bus (125) see substantially the same voltage.

Regarding the prime mover "startup" mode of operation, where electrical torque is required to accelerate the prime mover (116) to enable start up of the main engine or APU, the motoring reluctance torque can be used to achieve such start up in applications where sufficient torque can be generated.

In embodiments of the present invention described above, the reluctance torque and AC voltage generation capability of a synchronous reluctance machine or a salient-pole synchronous machine is used to achieve both AC electric power generation, as well as prime mover start-up. The embodiments provide AC power production capability by using a synchronous reluctance machine and a power converter. The embodiments can also provide AC power generation capability by using the reluctance power of a salient-pole synchronous machine without dependence upon rotor current where the prime mover is operational, i.e. rotating, and can be used for both APU and main engine generators Although only a few exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention as defined in the following claims.

What is claimed is:

1. An apparatus for reluctance power production using a synchronous reluctance machine, said apparatus comprising:
    an AC bus electrically coupling via an AC bus a synchronous reluctance machine with a power converter, wherein the synchronous reluctance machine is driven by a prime mover;
    a first sensor for measuring at least one of a DC link voltage for comparison with a commanded DC link voltage $V_{dc,com}$, a second sensor for measuring an AC capacitor voltage for comparison with a commanded AC capacitor voltage $v_{cap}$, and a third sensor for measuring an AC inductor current; and
    a controller for controlling said converter for generating reluctance power by reason of different magnetic reluctance between direct and quadrature axes of the driven synchronous reluctance machine using said measured DC link voltage, AC capacitor voltage and AC inductor current.

2. The apparatus for reluctance power production as claimed in claim 1, wherein said synchronous reluctance machine comprises a rotor having a saliency and which rotates when driven by said prime mover, and an armature winding, wherein said armature winding is electrically coupled to said power converter via said AC bus.

3. The apparatus for reluctance power production as claimed in claim 1, further comprising a plurality of wye coupled capacitors for measuring said AC voltage of said AC bus.

4. The apparatus for reluctance power production as claimed in claim 1, further comprising a plurality of series coupled inductors for measuring said AC current of said AC bus.

5. The apparatus for reluctance power production as claimed in claim 1, wherein said controller comprises:
    a first comparator for comparing said DC link voltage with said commanded DC link voltage $V_{dc,com}$ to obtain a d axis inverter current command;
    a second comparator for comparing said AC capacitor voltage with said commanded AC capacitor voltage $v_{cap}$ to obtain a q axis inverter current command;
    a vector formation block for forming a commanded current Park vector using said d and q axis inverter current commands;
    a third comparator for comparing said commanded current Park vector with a measured current Park vector to obtain a voltage command Park vector in synchronous reference frame; and
    a second multiplier for transforming said voltage command Park vector in synchronous reference frame using a rotor angle transformation value to obtain a voltage command Park vector in stationary reference frame for driving said converter to obtain an AC voltage on said AC bus.

6. The apparatus for reluctance power production as claimed in claim 1, wherein said controller comprises:
    a first comparator for comparing said DC link voltage with said commanded DC link voltage $V_{dc,com}$ and a first summer for summing the result with a rotor angle value to obtain a rotor angle transformation value;
    a second comparator for comparing said AC capacitor voltage with said commanded AC capacitor voltage $v_{cap}$ to obtain a u axis inverter current command;
    a vector formation block for receiving said u axis inverter current command and a v axis inverter current command set to zero and forming a commanded current Park vector;
    a third comparator for comparing said commanded current Park vector with a measured current Park vector to obtain a voltage command Park vector in synchronous reference frame; and
    a second multiplier for transforming said voltage command Park vector in synchronous reference frame using said rotor angle transformation value to obtain a voltage command Park vector in stationary reference frame for driving said converter to obtain an AC voltage on said AC bus.

7. The apparatus for reluctance power production as claimed in claim 1, further comprising a rotor sensor for detecting a rotor angle of said synchronous reluctance machine.

8. The apparatus for reluctance power production as claimed in claim 1, wherein a rotor angle of said synchronous reluctance machine is based upon an estimate.

9. An apparatus for reluctance power production using a synchronous reluctance machine, said apparatus comprising:
   a power converter electrically coupled with said synchronous reluctance machine;
   a prime mover driving said synchronous reluctance machine;
   a first sensor measuring a DC link voltage for comparison with a commanded DC link voltage $V_{dc,com}$;
   a second sensor measuring an AC capacitor voltage for comparison with a commanded AC capacitor voltage $V_{cap}$;
   a third sensor measuring an AC inductor current; and
   a controller generating reluctance power by reason of different magnetic reluctance between direct and quadrature axes of the driven synchronous reluctance machine and the control of said power converter using said measured DC link voltage, AC capacitor voltage and AC inductor current.

10. The apparatus for reluctance power production as claimed in claim 9, wherein said synchronous reluctance machine comprises a rotor having a saliency and which rotates when driven by said prime mover, and an armature winding, wherein said armature winding is electrically coupled to said power converter via said AC bus.

11. The apparatus for reluctance power production as claimed in claim 9, further comprising:
   a plurality of wye coupled capacitors for measuring said AC voltage of said AC bus; and
   a plurality of series coupled inductors for measuring said AC current of said AC bus.

12. The apparatus for reluctance power production as claimed in claim 9, wherein said controller comprises:
   a first comparator for comparing said DC link voltage with said commanded DC link voltage $V_{dc,com}$ to obtain a d axis inverter current command;
   a second comparator for comparing said AC capacitor voltage with said commanded AC capacitor voltage $v_{cap}$ to obtain a q axis inverter current command;
   a vector formation block for forming a commanded current Park vector using said d and q axis inverter current commands;
   a third comparator for comparing said commanded current Park vector with a measured current Park vector to obtain a voltage command Park vector in synchronous reference frame; and
   a second multiplier for transforming said voltage command Park vector in synchronous reference frame using a rotor angle transformation value to obtain a voltage command Park vector in stationary reference frame for driving said converter to obtain an AC voltage on said AC bus.

13. The apparatus for reluctance power production as claimed in claim 9, wherein said controller comprises:
   a first comparator for comparing said DC link voltage with said commanded DC link voltage $V_{dc,com}$ and a first summer for summing the result with a rotor angle value to obtain a rotor angle transformation value;
   a second comparator for comparing said AC capacitor voltage with said commanded AC capacitor voltage $v_{cap}$ to obtain a u axis inverter current command;
   a vector formation block for receiving said u axis inverter current command and a v axis inverter current command set to zero and forming a commanded current Park vector;
   a third comparator for comparing said commanded current Park vector with a measured current Park vector to obtain a voltage command Park vector in synchronous reference frame; and
   a second multiplier for transforming said voltage command Park vector in synchronous reference frame using said rotor angle transformation value to obtain a voltage command Park vector in stationary reference frame for driving said converter to obtain an AC voltage on said AC bus.

14. The apparatus for reluctance power production as claimed in claim 13, further comprising a rotor sensor for detection said rotor angle value of said synchronous reluctance machine.

15. The apparatus for reluctance power production as claimed in claim 13, wherein said rotor angle value of said synchronous reluctance machine is determined by an estimate of said rotor angle value.

16. An apparatus for reluctance power production using a salient-pole synchronous machine, said apparatus comprising:
   a rotor of said salient-pole synchronous machine, said rotor having saliency;
   a power converter electrically coupled with an armature winding of said salient-pole synchronous machine;
   a prime mover driving said rotor of said salient-pole synchronous machine;
   a sensor for detecting a main field flux via direct or indirect means in said salient-pole synchronous machine to detect a loss of rotor field;
   a position sensor for detecting rotor position of said rotor; and
   a controller for controlling said power converter to generate reluctance power from said salient-pole synchronous machine when there is a loss of rotor field and rotor rotation is detected using position sensor.

17. The apparatus as claimed in claim 16, further comprising:
   a first sensor for measuring at least one of a DC link voltage for comparison with a commanded DC link voltage $V_{dc,com}$;
   a second sensor for measuring an AC capacitor voltage for comparison with a commanded AC capacitor voltage $v_{cap}$; and
   a third sensor for measuring an AC inductor current.

18. The apparatus as claimed in claim 17, wherein said controller comprises:
   a first comparator for comparing said DC link voltage with said commanded DC link voltage $V_{dc,com}$ to obtain a d axis inverter current command;
   a second comparator for comparing said AC capacitor voltage with said commanded AC capacitor voltage $v_{cap}$ to obtain a q axis inverter current command;
   a vector formation block for forming a commanded current Park vector using said d and q axis inverter current commands;
   a third comparator for comparing said commanded current Park vector with a measured current Park vector to obtain a voltage command Park vector in synchronous reference frame;

a second multiplier for transforming said voltage command Park vector in synchronous reference frame using a rotor angle transformation value to obtain a voltage command Park vector in stationary reference frame for driving said converter to obtain an AC voltage on said AC bus;

a first summer for summing an output of the first comparator with a rotor angle value to obtain a rotor angle transformation value, wherein the vector formation block receives said d axis inverter current command and a v axis inverter current command set to zero to form said commanded current Park vector.

19. The apparatus for reluctance power production as claimed in claim 17, wherein said controller comprises:

a first comparator for comparing said DC link voltage with said commanded DC link voltage $V_{dc,com}$ and a first summer for summing the result with a rotor angle value to obtain a rotor angle transformation value;

a second comparator for comparing said AC capacitor voltage with said commanded AC capacitor voltage $v_{cap}$ to obtain a u axis inverter current command;

a vector formation block for receiving said u axis inverter current command and a v axis inverter current command set to zero and forming a commanded current Park vector;

a third comparator for comparing said commanded current Park vector with a measured current Park vector to obtain a voltage command Park vector in synchronous reference frame; and a second multiplier for transforming said voltage command Park vector in synchronous reference frame using said rotor angle transformation value to obtain a voltage command Park vector in stationary reference frame for driving said converter to obtain an AC voltage on said AC bus.

20. The apparatus as claimed in claim 16, wherein a rotor angle value of said salient-pole synchronous machine is determined by one of a rotor sensor or an estimate of said rotor angle value.

* * * * *